United States Patent
Sakai

(10) Patent No.: US 10,310,871 B2
(45) Date of Patent: Jun. 4, 2019

(54) NON-TRANSITORY COMPUTER-READABLE RECORDING MEDIUM STORING CONTROL PROGRAM, CONTROL DEVICE AND CONTROL METHOD

(71) Applicant: FUJITSU LIMITED, Kawasaki-shi, Kanagawa (JP)

(72) Inventor: Takafumi Sakai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 291 days.

(21) Appl. No.: 15/361,548

(22) Filed: Nov. 28, 2016

(65) Prior Publication Data
US 2017/0228243 A1   Aug. 10, 2017

(30) Foreign Application Priority Data

Feb. 8, 2016   (JP) .................................. 2016-021954

(51) Int. Cl.
*G06F 9/445*   (2018.01)
(52) U.S. Cl.
CPC ................. *G06F 9/44521* (2013.01)
(58) Field of Classification Search
None
See application file for complete search history.

(56) References Cited

U.S. PATENT DOCUMENTS

| | | | |
|---|---|---|---|
| 2002/0129043 A1* | 9/2002 | Nakada et al. | |
| 2007/0162538 A1 | 7/2007 | Kim et al. | |
| 2010/0274857 A1* | 10/2010 | Garza et al. | |
| 2011/0276538 A1* | 11/2011 | Knapp et al. | |
| 2012/0023147 A1 | 1/2012 | Kim et al. | |
| 2017/0102925 A1* | 4/2017 | Ali et al. | |

FOREIGN PATENT DOCUMENTS

| | | |
|---|---|---|
| JP | 2004-70617 | 3/2004 |
| JP | 2008-512764 | 4/2008 |
| WO | 2006/110005 | 10/2006 |

* cited by examiner

*Primary Examiner* — Syed A Roni
(74) *Attorney, Agent, or Firm* — Fujitsu Patent Center

(57) ABSTRACT

A non-transitory computer-readable recording medium having stored therein a control program for causing a computer to execute a control process, the control process includes: when a program of an execution file group generated by including an execution file of the program and a call processing execution file including specifying information, which specifies that the call processing execution file includes an instruction to be called by an external program, is started, storing the call processing execution file specified based on the specifying information in a storage area capable of being referenced by an execution based program which executes the program; referencing the storage area according to a retrieval request by the external program; and extracting an instruction of the call processing execution file corresponding to the retrieval request.

12 Claims, 15 Drawing Sheets

FIG. 5

```
                          PROGRAM B
public void main(String arg) {
If () {                                                        16A
    searchAPI("transferMoney", 100, 201133344, ordinary)
}
```
16

FIG. 8

```
                    PROGRAM B                      16
public void main(String arg) {
If () {                                      16B
   transferMoney(100, 201133344, ordinary)
}
```

NON-TRANSITORY COMPUTER-READABLE RECORDING MEDIUM STORING CONTROL PROGRAM, CONTROL DEVICE AND CONTROL METHOD

CROSS-REFERENCE TO RELATED APPLICATION

This application is based upon and claims the benefit of priority of the prior Japanese Patent Application No. 2016-021954, filed on Feb. 8, 2016, the entire contents of which are incorporated herein by reference.

FIELD

The embodiments discussed herein are related to a non-transitory computer-readable recording medium storing a control program, a control device, and a control method.

BACKGROUND

In recent years, there have been many cases where it is difficult to implement all functions requested from a customer by using a single body program, and the corresponding functions are fulfilled in cooperation with other programs.

Related techniques are disclosed in, for example, Japanese National Publication of International Patent Application No. 2008-512764 and Japanese Laid-Open Patent Publication No. 2004-070617.

SUMMARY

According to one aspect of the embodiments, a non-transitory computer-readable recording medium having stored therein a control program for causing a computer to execute a control process, the control process includes: when a program of an execution file group generated by including an execution file of the program and a call processing execution file including specifying information, which specifies that the call processing execution file includes an instruction to be called by an external program, is started, storing the call processing execution file specified based on the specifying information in a storage area capable of being referenced by an execution based program which executes the program; referencing the storage area according to a retrieval request by the external program; and extracting an instruction of the call processing execution file corresponding to the retrieval request.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a program B;

FIG. 8 is a diagram illustrating an example of the program B in which an instruction is replaced with;

DESCRIPTION OF EMBODIMENTS

In a technology relating to the cooperation, contents formed by a multifile including at least one of an execution file and a dynamic link library (DLL) file are saved and package list information about the multifile is generated. Further, the DLL file is installed at different directories for each version.

In the related art, for example, an execution based program (hereinafter, referred to as an "execution base") executing a program such as, for example, Java (registered trademark) Virtual Machine (JVM) is executed when a program prepared by, for example, Java is started. For example, the execution base does not keep information about, for example, a storing place of a program to be started until the program is executed. As a result, when a developer of the program intends to use a function for cooperating with another program, the developer may not know information such as a storing place of another program and as a result, may be unable to use the function.

One program may be easily cooperate with another program.

Figure 1:
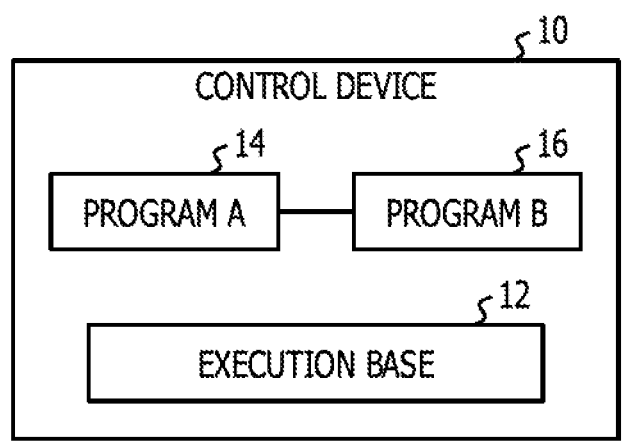
FIG. 1 is a block diagram schematically illustrating a configuration of a control device according to an embodiment.

Hereinafter, an exemplary embodiment of the present disclosure will be described in detail with reference to the accompanying drawings. In the present embodiment, an exemplary form in which a function of a program A14 executed on an execution base 12 of each control device 10 is used from a program B16, as illustrated in FIG. 1, will be described as an example. For example, an exemplary form in which an application program for using a bank account is applied as a program A14 and an application program for preparing a housekeeping book is applied as a program B16 will be described as an example. In addition, an exemplary form in which the function of a program A14 is used from the program B16 to perform a processing such as a bank transfer or a balance inquiry of a bank account will be described as an example. An example of the control device 10 may include a smart phone, a personal computer or the like, and an example of the execution base 12 may include the JVM, a NET Framework (registered trademark) or the like.

First, a configuration of a terminal 20 in which a developer A of the program A14 performs the development of the program A14 will be described with reference to FIG. 2.

Figure 2:
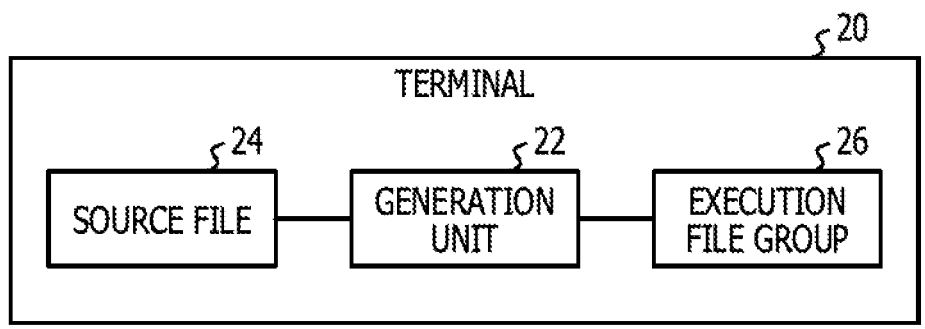
FIG. 2 is a functional block diagram schematically illustrating a configuration of a terminal according to the embodiment.

As illustrated in FIG. 2, the terminal 20 includes a generation unit 22. The generation unit 22 generates an execution file group 26 from a source file 24 which is prepared by the developer A and in which a source code of the program A14 is written. It is assumed that in the source file 24, respective instructions (methods) written in the source file 24 in a specific format of, for example, JavaDoc or the like, by the developer A and a comment in which, for example, processing contents and arguments of respective instructions are associated with each other are written.

Figure 3:
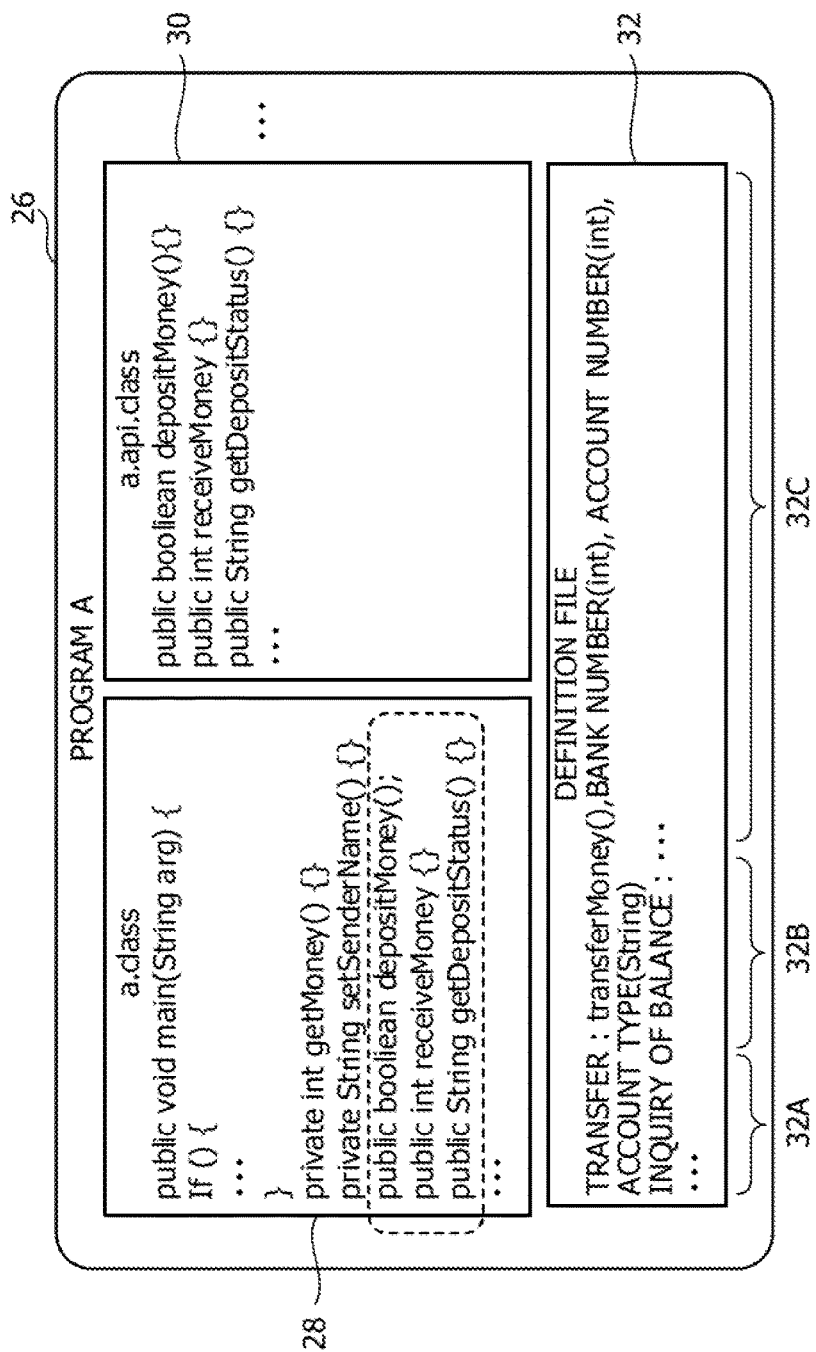
FIG. 3 is a diagram illustrating an example of an execution file group according to the embodiment.

For example, as an example, as illustrated in FIG. 3, the generation unit 22 complies the source file 24 so as to generate an execution file group 26 including an execution file 28 of a body of the program A14. The generation unit 22, as a file different from the execution file 28, generates the execution file group 26 also including a call processing execution file 30 which only includes the instruction to be opened to outside. For example, the generation unit 22 extracts only an instruction including information which indicates that the instruction is to be opened to outside from the execution file 28 to generate the call processing execution file 30. In the present embodiment, as the instruction including information which indicates that the instruction is to be opened to outside, the instruction (instruction surrounded by a dashed line illustrated in FIG. 3) of which an access modifier is "public" is applied, but the present disclosure is not limited thereto. For example, a form for applying an instruction declared as an interface may be adopted as the instruction including information which indicates that the instruction is to be opened to outside.

The generation unit 22 may generate a file obtained by extracting only the instruction including information which indicates that the instruction is to be opened to outside from the source file 24 and generate the call processing execution file 30 by compiling the generated file.

The generation unit 22 according to the present embodiment adds a specific character string (".api" in the present embodiment) to a file name of the call processing execution file 30, as information specifying that the file is the call processing execution file including the instruction to be called by an external program. The generation unit 22 may add the above-mentioned information specifying to, for example, an attribute, which is a portion other than a file name, of the call processing execution file 30.

The generation unit 22 according to the present embodiment generates the execution file group 26 by including also a definition file 32 in which information 32A indicating processing contents such as "transfer" is associated with information 32C used for calling an instruction 32B and an instruction 32B based on the above-mentioned comment. In the present embodiment, the generation unit 22 generates the definition file 32 regarding the instruction including information which indicates that the instruction is to be opened to outside based on the above-mentioned comment. As illustrated in FIG. 3, as an example, the definition file 32 according to the present embodiment includes a content of an argument which is used when using the instruction and a type of the argument as information 32C used for calling the instruction. The generation unit 22 also adds information specifying that the file is the definition file to the definition file 32 similar to the call processing execution file 30. As such, in the present embodiment, although information indicating contents of a single type of processing is included in the information 32A, but the present disclosure is not limited thereto. For example, when the instruction 32B corresponds to an instruction performing a plurality of types of processing, information indicating contents of the plurality of types of processing may be included in the information 32A.

Figure 4:
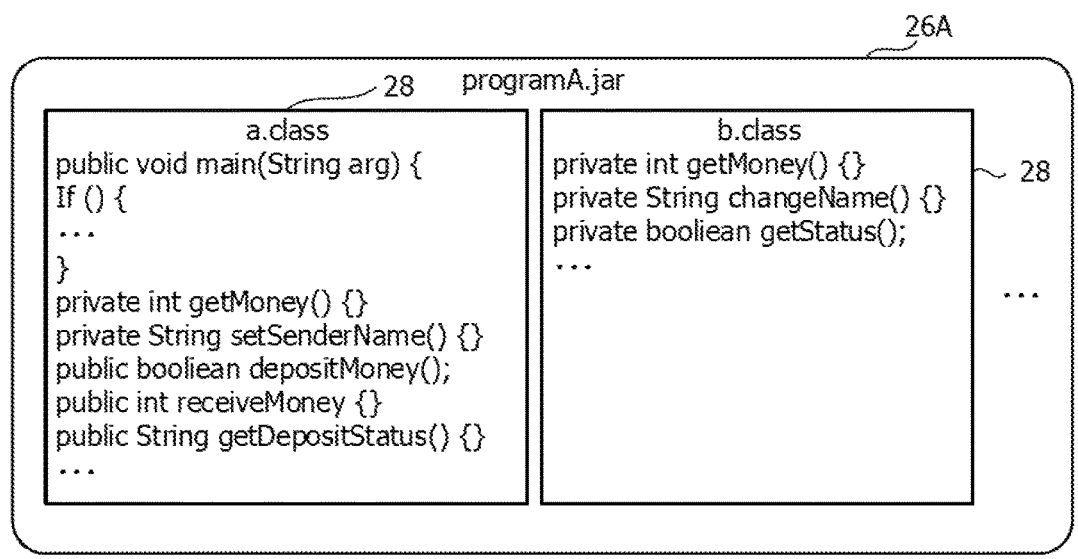
FIG. 4 is a diagram illustrating an example of an execution file group in a case where an instruction called by an external program is not taken into account.

For example, when the instruction to be called by the external program is not taken into account, as illustrated in FIG. 4, an execution file group 26A in which the execution file 28 corresponding to the source file 24 is included is generated. In contrast, in the present embodiment, the execution file group 26, which includes the call processing execution file 30 and the definition file 32 in addition to the execution file 28, is generated by the generation unit 22. Accordingly, the developer A may generate the execution file group 26 without changing the developing method from the related art. In the present embodiment, only the instructions to be opened to outside form a file different from the program body such that a size of the file including the instructions becomes small. Therefore, the performance is improved when calling the instruction.

Next, a program B16 to be developed by the developer B of the program B16 will be described with reference to FIG. 5. As illustrated in FIG. 5, when an external instruction (instruction opened by the program A14) is used in developing the program B16, the developer B writes an instruction 16A indicating that the external instruction is to be retrieved. A first argument of the instruction 16A is information indicating processing contents regarded as a retrieval target, and second and succeeding arguments are information used for executing the processing contents. FIG. 5 represents a case where an instruction to perform bank transfer on a bank account of which a bank number is "100," an account number is "201133344," and an account type is an "ordinary account" is applied as an example of the instruction 16A. Respective arguments of the instruction 16A are determined by inputs and others from a user's manipulation of a terminal in which the program B16 is installed.

Figure 6:
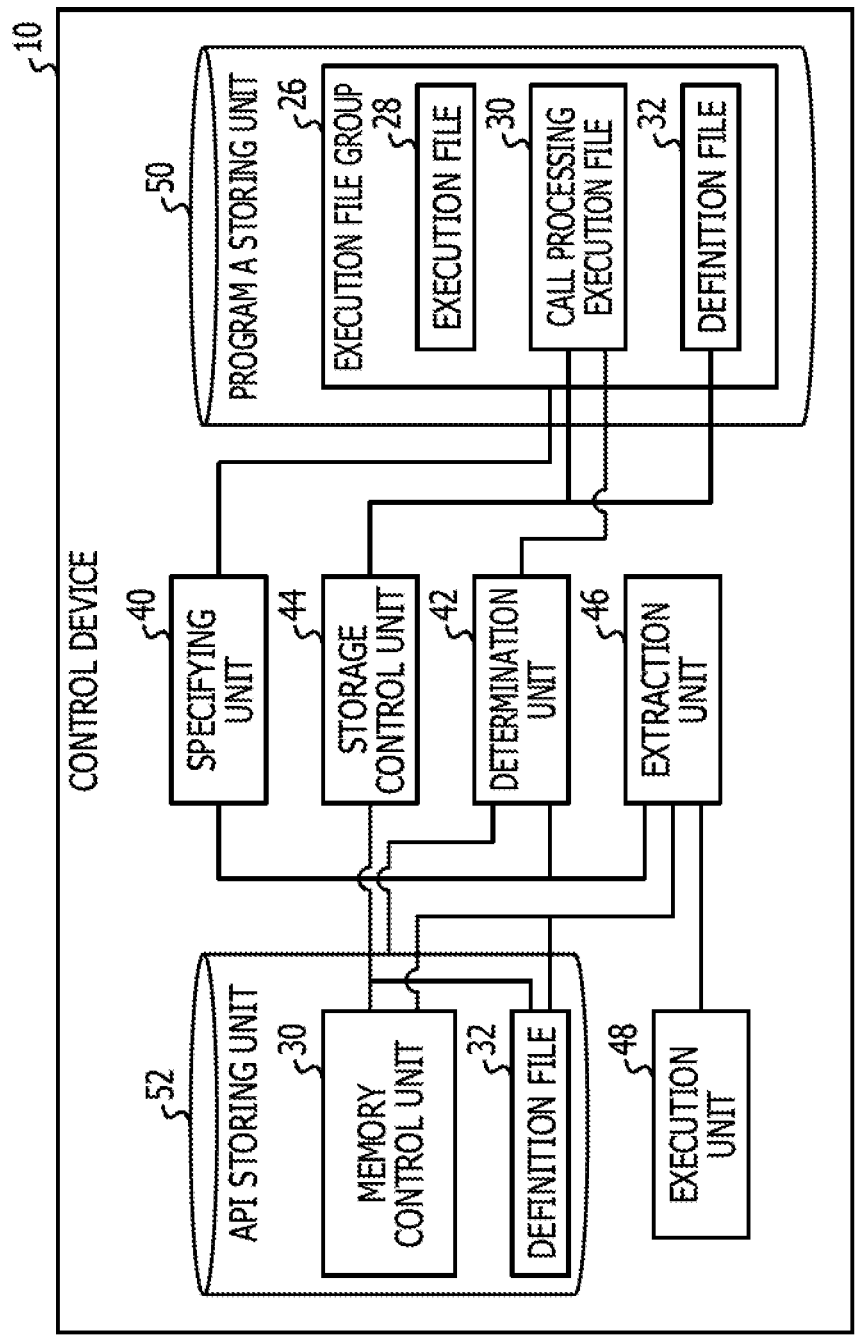
FIG. 6 is a functional block diagram schematically illustrating the control device according to the embodiment.

Next, a configuration of the control device 10 will be described with reference to FIG. 6. As illustrated in FIG. 6, the control device 10 includes a specifying unit 40, a determination unit 42, a storage control unit 44, an extraction unit 46, and an execution unit 48. In a specific storage area of the control device 10, a program A storing unit 50 and an application programming interface (API) storing unit 52 are provided.

The specifying unit 40 specifies a file having a file name including the character string of ".api," among respective files of the execution file group 26 of the program A14 stored (installed) in the program A storing unit 50, as the call processing execution file 30. Further, the specifying unit 40 specifies the definition file 32 from the respective files of the execution file group 26, similar to the call processing execution file 30.

The determination unit 42 determines whether the same file as the call processing execution file 30 specified by the specifying unit 40 has been stored in the API storing unit 52. For example, the determination unit 42 determines whether a call processing execution file 30 has been stored in the API storing unit 52, and a size of the call processing execution file 30 and that of the call processing execution file 30 specified by the specifying unit 40 are the same.

The determination unit 42 may perform the determination of whether the files are the same by using a timestamp of a file or a checksum such as the MDSSUM of a file rather than a file size. Further, the determination unit 42 may perform the determination of whether the files are the same by using, for example, two or more of the file size, the timestamp, and the checksum. The determination unit 42 also determines whether the same file as the definition file 32 specified by the specifying unit 40 has been stored in the API storing unit 52, similar to the call processing execution file 30.

When it is determined by the determination unit 42 that the same file as the call processing execution file 30 specified by the specifying unit 40 has not been stored in the API storing unit 52, the storage control unit 44 stores (updates) the corresponding call processing execution file 30 in the API storing unit 52.

Figure 7:
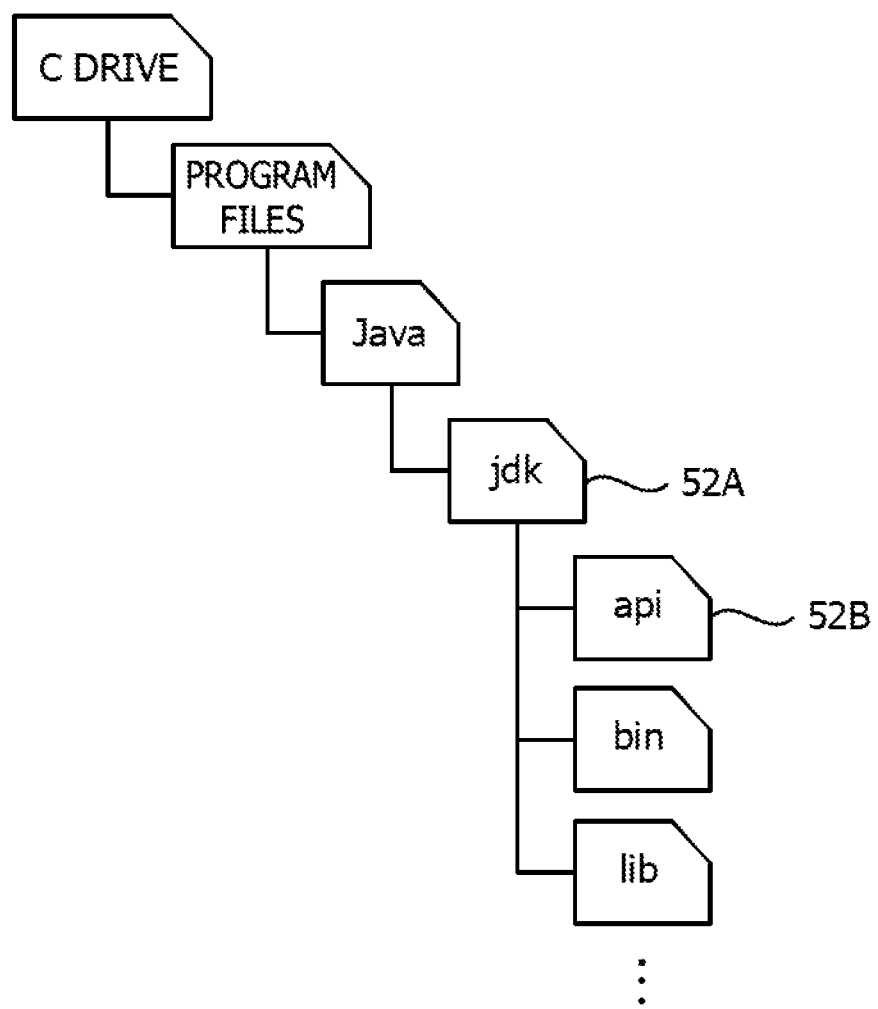
FIG. 7 is a diagram illustrating an example of a storage destination of a call processing execution file.

In the present embodiment, the API storing unit 52 is set as a storage area capable of being referenced by the execution base 12. For example, as an example, as illustrated in FIG. 7, the storage control unit 44 stores the call processing execution file 30 in a directory 52B under a directory 52A in which the execution base 12 is installed. The directory 52B under the directory 52A is an example of a storage area (API storing unit 52 illustrated in FIG. 6) capable of being referenced by the execution base 12. FIG. 7 represents a case where "C:¥Program Files¥Java¥jdk" is applied as an example of the directory 52A, and "api" is applied as an example of the directory 52B.

Meanwhile, when it is determined by the determination unit 42 that the same file as the call processing execution file 30 specified by the specifying unit 40 has been stored in the API storing unit 52, the storage control unit 44 does not store the corresponding call processing execution file 30 in the API storing unit 52. The storage control unit 44 stores the definition file 32 in the API storing unit 52, similar to the call processing execution file 30.

In the present embodiment, the example where the respective processings performed by the specifying unit 40, the determination unit 42, and the storage control unit 44 as described above are executed when the program A14 is started, but the present disclosure is not limited thereto. For example, the respective processings performed by the specifying unit 40, the determination unit 42, and the storage control unit 44 may be executed by causing the program A14 to be started in a background when the program A14 is installed.

When an instruction to execute the instruction 16A of the program B16 is input by the manipulation of the user, the extraction unit 46 performs the following processing based on the argument of the instruction 16A and the definition file 32 stored in the API storing unit 52.

In a case where information 32A corresponding to a first argument of the instruction 16A exists in the definition file 32, the extraction unit 46 extracts the instruction 32B and information 32C associated with the information 32A from the definition file 32. In this case, next, the extraction unit 46 examines whether the number of second and succeeding arguments of the instruction 16A coincides with the number of arguments of the information 32C. When it is determined that the numbers of arguments coincide with each other, the extraction unit 46 examines whether the type of the second and succeeding arguments of the instruction 16A matches the type of the argument of the extracted information 32C (performs a so-called format check).

When it is determined that the types of arguments match with each other, the extraction unit 46 extracts an instruction corresponding to the instruction 32B from the call processing execution file 30 stored in the API storing unit 52. The extraction unit 46 replaces the instruction 16A of the program B16 with the instruction 16B using the extracted instruction as illustrated in FIG. 8 by way of an example. FIG. 8 represents an example in which the instruction 16A illustrated in FIG. 5 is replaced with the instruction 16B (transfer Money) corresponding to the instruction 16A. As illustrated in FIG. 8, in the present embodiment, the instruction 16A is an instruction corresponding to processing contents of the first argument of the instruction 16A and is replaced with the instruction 16B having the arguments are set as the second and succeeding arguments of the instruction 16A.

Figure 9:
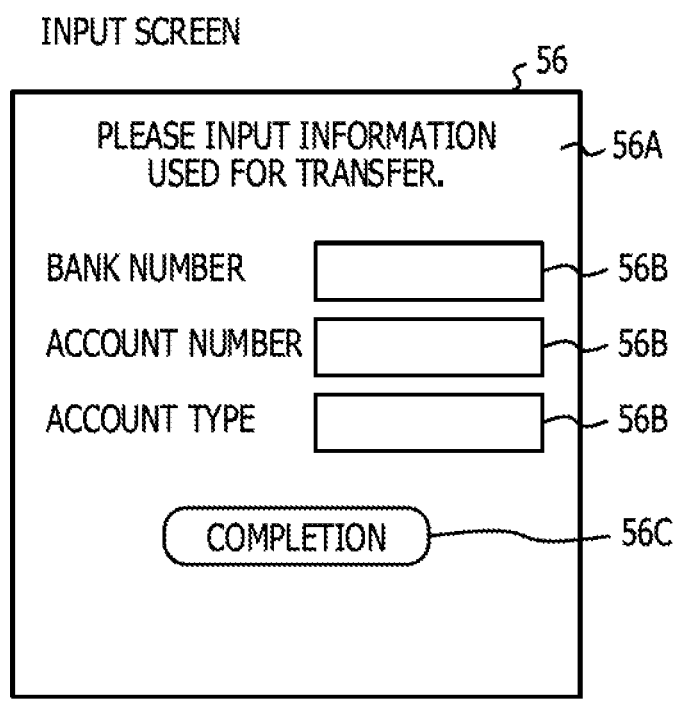
FIG. 9 is a diagram illustrating an example of an input screen.

Meanwhile, when it is determined that the numbers of the arguments or the types of the arguments do not match with each other, the extraction unit 46 displays an input screen allowing a user to input an argument on a display device based on the extracted information 32C. FIG. 9 illustrates an example of an input screen 56. As illustrated in FIG. 9, the input screen 56 according to the present embodiment includes a message 56A prompting a user to input information used for executing the instruction 16A, an input field 56B for the information, and a button 56C for performing designation by the user after inputting the information.

When the input screen 56 is displayed on the display device, the user inputs information in the input field 56B and designates the button 56C. When the button 56C is designated by the user, the extraction unit 46 performs the processing for examining the number of arguments as described above based on the information input to the input field 56B and the extracted information 32C. Further, the extraction unit 46 performs the format check processing described above and the processing for replacing the instruction 16A with the instruction 16B described above based on the information input to the input field 56B and the extracted information 32C.

Figure 10:
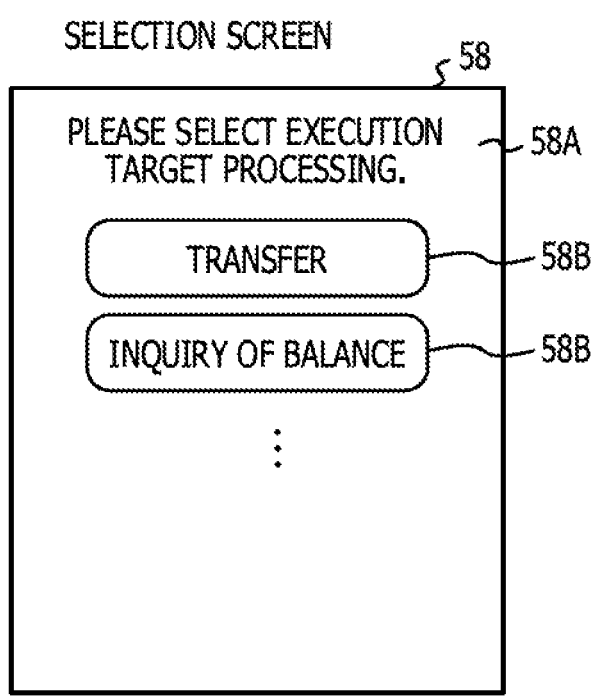
FIG. 10 is a diagram illustrating an example of a selection screen.

In a case where the information 32A corresponding to the first argument of the instruction 16A does not exist in the definition file 32, the extraction unit 46 extracts the information 32A from the definition file 32 and displays a selection screen allowing the user to select a processing to be executed, on the display device. FIG. 10 illustrates an example of a selection screen 58.

As illustrated in FIG. 10, the selection screen 58 according to the present embodiment includes a message 58A prompting a user to select a processing to be executed and a button 58B allowing the user to select a processing corresponding to the information 32A extracted from the definition file 32. When the selection screen 58 is displayed on the display device, the user designates the button 58B corresponding to the processing to be executed. When the button 58B is designated by the user, the extraction unit 46 displays an input screen 56 (see, e.g., FIG. 9), which allows the user to input an argument of an instruction to execute the processing corresponding to the designated button 58B, on the display device. Subsequent processing is identical to the processing described above, and thus, descriptions thereof will be omitted. In a case where a plurality of pieces of information 32A corresponding to the first argument of the instruction 16A exist in the definition file 32, the extraction unit 46 may extract the plurality of pieces of information 32A from the definition file 32a and display the selection screen which allows the user to select the processing to be executed, on the display device. In a case where a plurality of pieces of information 32A are extracted from the definition file 32, the extraction unit 46 may select a single piece of information 32A according to a specific logic. In this case, examples of the logic may include a logic in which the information 32A corresponding to information 32C including the same number of arguments as the number of the second and succeeding arguments of the instruction 16A is selected.

The execution unit 48 executes the instruction 16B replaced by the extraction unit 46.

Figure 11:
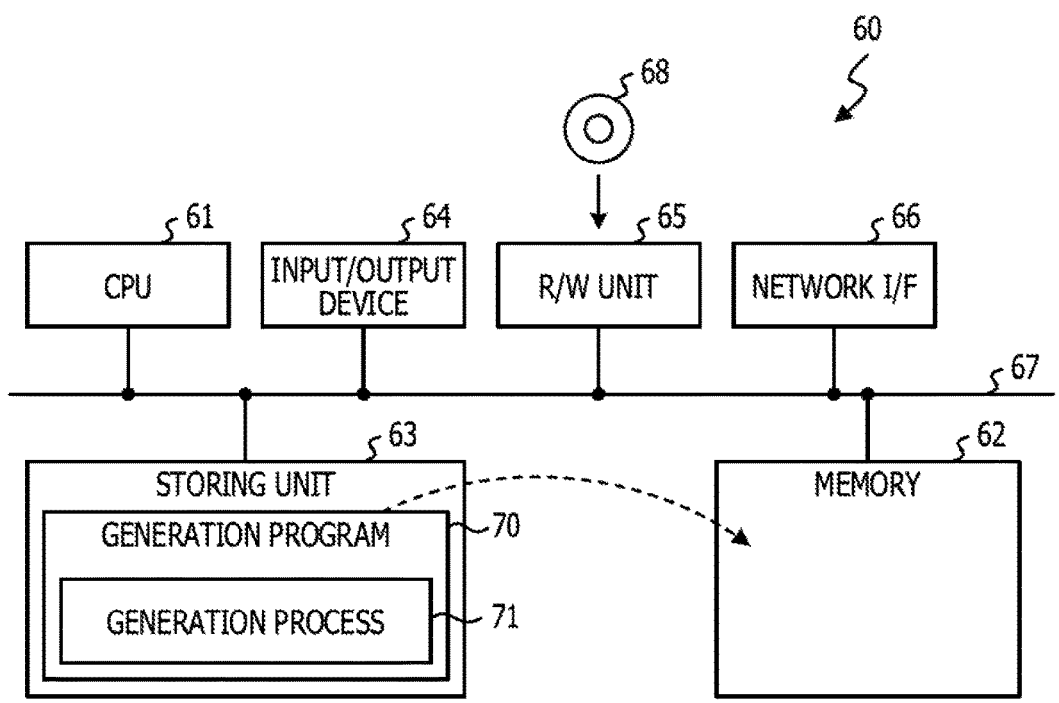
FIG. 11 is a block diagram schematically illustrating a configuration of a computer functioning as the terminal according to the embodiment.

The terminal 20 may be implemented by, for example, a computer 60 illustrated in FIG. 11. The computer 60 includes a central processing unit (CPU) 61, a memory 62 as a temporary storage area, and a non-volatile storing unit 63. Further, the computer 60 includes an input/output device 64, a R/W unit 65 to control reading and writing of data from and to a recording medium 68, and a network I/F 66 coupled to a network such as the Internet. The CPU 61, the memory 62, the storing unit 63, the input/output device 64, the R/W unit 65, and the network I/F 66 are coupled with each other through a bus 67.

The storing unit 63 may be implemented by, for example, a hard disk drive (HDD), a solid state drive (SDD), and a flash memory. A generation program 70 for causing the computer 60 to function as the terminal 20 is stored in the storing unit 63 as a storage medium. The generation program 70 includes a generation process 71.

The CPU 61 reads the generation program 70 from the storing unit 63, deploys the generation program 70 in the memory 62, and executes the process included in the generation program 70. The CPU 61 executes the generation process 71 to operate as the generation unit 22 illustrated in FIG. 2. With this, the computer 60 executing the generation program 70 functions as the terminal 20.

Figure 12:
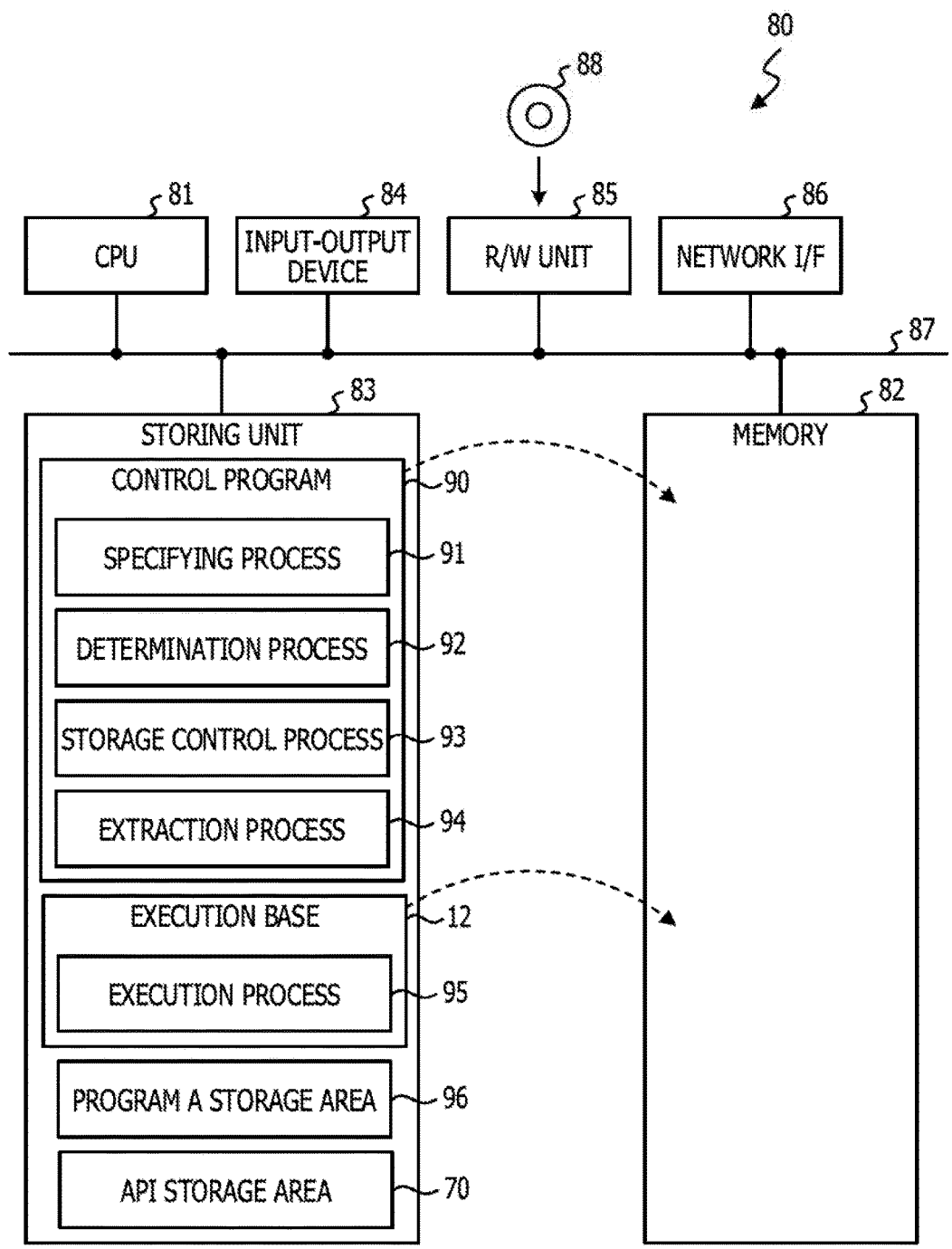
FIG. 12 is a block diagram schematically illustrating a configuration of a computer functioning as the control device according to the embodiment.

The control device 10 may be implemented by, for example, a computer 80 illustrated in FIG. 12. The computer 80 includes a CPU 81, a memory 82 as a temporary storage area, and a nonvolatile storing unit 83. The computer 80 includes an input/output device 84, a R/W unit 85 to control reading and writing of data from and to a recording medium 88, and a network I/F 86 coupled to a network such as the Internet. The CPU 81, the memory 82, the storing unit 83, the input/output device 84, the R/W unit 85, and the network I/F 86 are coupled with each other through a bus 87.

The storing unit 83 may be implemented by, for example, a HDD, an SDD, and a flash memory. A control program 90 for causing the computer 80 to function as the control device 10 and the execution base 12 are stored in the storing unit 83 as a storage medium. The control program 90 includes a specifying process 91, a determination process 92, a storage control process 93, and an extraction process 94. The execution base 12 includes an execution process 95. The storing unit 83 includes a program A storage area 96 functioning as the program A storing unit 50 and an API storage area 97 functioning as the API storing unit 52.

The CPU 81 reads the control program 90 from the storing unit 83, deploys the control program 90 in the memory 82, and sequentially executes the process included in the control program 90. Further, the CPU 81 reads the execution base 12 from the storing unit 83, deploys the execution base 12 in the memory 82, and sequentially executes the process included in execution base 12.

The CPU 81 executes the specifying process 91 to operate as the specifying unit 40 illustrated in FIG. 6. The CPU 81 executes the determination process 92 to operate as the determination unit 42 illustrated in FIG. 6. The CPU 81 executes the storage control process 93 to operate as the storage control unit 44 illustrated in FIG. 6. The CPU 81 executes the extraction process 94 to operate as the extraction unit 46 illustrated in FIG. 6. The CPU 81 executes the execution process 95 to operate as an execution unit 48 illustrated in FIG. 6. Accordingly, the computer 80 executing the control program 90 and the execution base 12 functions as the control device 10.

In the present embodiment, the case where the control program 90 is developed as a separate program from the execution base 12 and provided as an add-in of the execution base 12 is described, but the present disclosure is not limited thereto. For example, the functions of the respective function units implemented by the control program 90 may be implemented by correcting the execution base 12 itself. In this case, the computer 80 executing the execution base 12 functions as the control device 10.

The functions implemented by the generation program 70 and the control program 90 may be implemented by, for example, a semiconductor integrated circuit such as an application specific integrated circuit (ASIC).

Next, the operation of the terminal 20 according to the present embodiment will be described. In the terminal 20, when an instruction to generate the execution file group 26 is input after the source file 24 is prepared by the developer A, the terminal 20 executes the generation program 70 to execute the generation process illustrated in FIG. 13.

Figure 13:
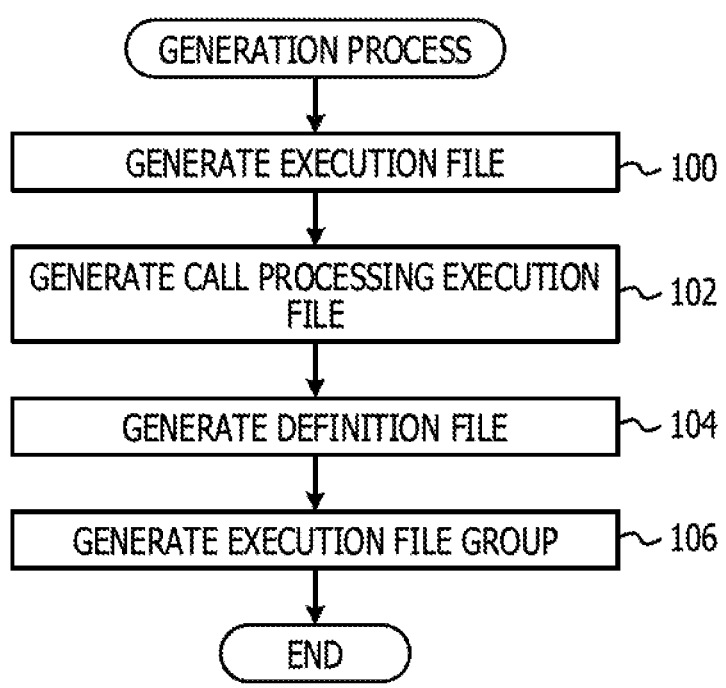
FIG. 13 is a flowchart illustrating an example of a generation process according to the embodiment.

At Operation 100 of the generation process illustrated in FIG. 13, the generation unit 22 compiles the source file 24 so as to generate the execution file 28. At subsequent Operation 102, the generation unit 22 extracts only an instruction including the information which indicates an instruction to be opened to outside, from the execution file 28 generated at Operation 100 and generates the call processing execution file 30.

At subsequent Operation 104, the generation unit 22 generates the definition file 32 in which the information 32A, the instruction 32B, and the information 32C used for calling the instruction 32B are associated with each other based on the comment included in the source file 24. At subsequent Operation 106, the generation unit 22 generates the execution file group 26 in which the execution file 28, the call processing execution file 30, and the definition file 32 generated at Operations 100 to 104 are formed in a single file and then ends the generation process. The execution file group 26 (program A14) generated in the generation process is installed in the control device 10, and thus, the execution file group 26 is stored in the program A storing unit 50. The order of generating the execution file 28, the call processing execution file 30, and the definition file 32 is not limited to the example described above and may be changed to generate the files.

Next, the operation of the control device 10 according to the present embodiment will be described. In the control device 10, when an instruction to start up the program A14 is input by a user, and the start-up of the execution base 12 is initiated, the control device 10 executes the control program 90 to execute the storing process illustrated in FIG. 14.

Figure 14:
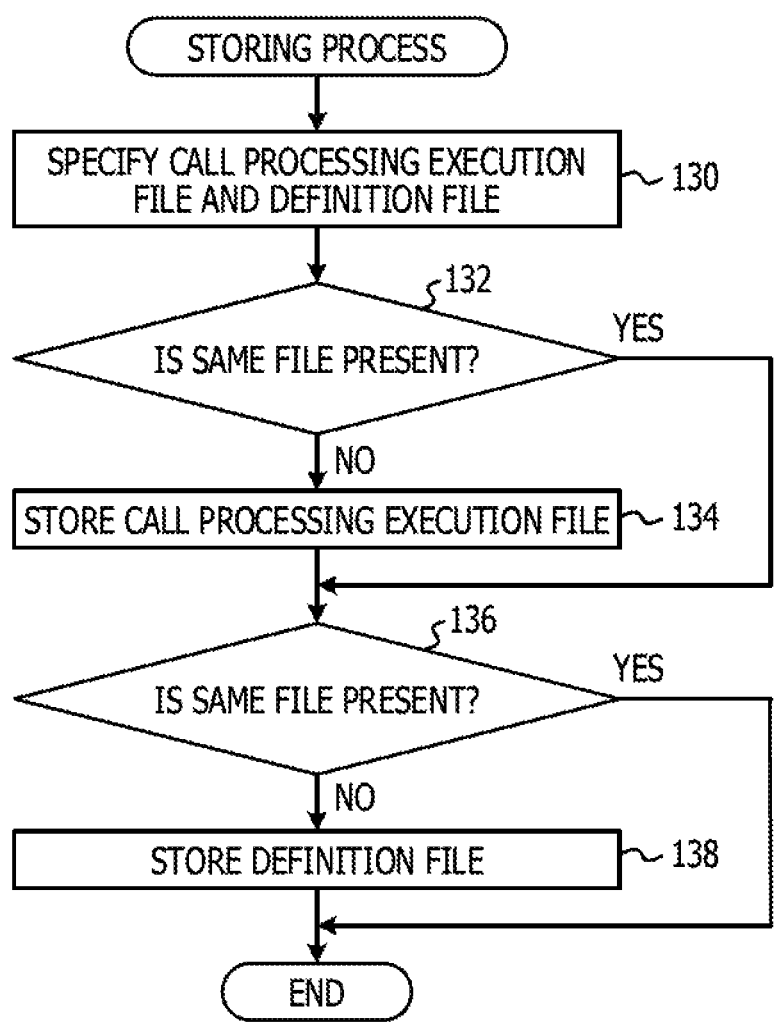
FIG. 14 is a flowchart illustrating an example of a storing process according to the embodiment.

At Operation 130 of the storing process illustrated in FIG. 14, the specifying unit 40, as described above, specifies the call processing execution file 30 and the definition file 32 from the respective files of the execution file group 26 stored in the program A storing unit 50.

At subsequent Operation 132, the determination unit 42, as described above, determines whether the same file as the call processing execution file 30 specified in Operation 130 has been stored in the API storing unit 52. When a result of the determination is No, the storing process proceeds to Operation 134, and when the result of the determination is Yes, the storing process proceeds to Operation 136. At Operation 134, the storage control unit 44 stores (updates)

the call processing execution file 30 specified in Operation 130 in the API storing unit 52.

At Operation 136, similar to Operation 132, the storage control unit 44 determines whether the same file as the definition file 32 specified in Operation 130 has been stored in the API storing unit 52. When a result of the determination is No, the storing process proceeds to Operation 138. At Operation 138, the storage control unit 44 stores (updates) the definition file 32 specified in Operation 130 in the API storing unit 52. Meanwhile, when the result of the determination at Operation 136 is Yes, the storing process is ended.

Figure 15:
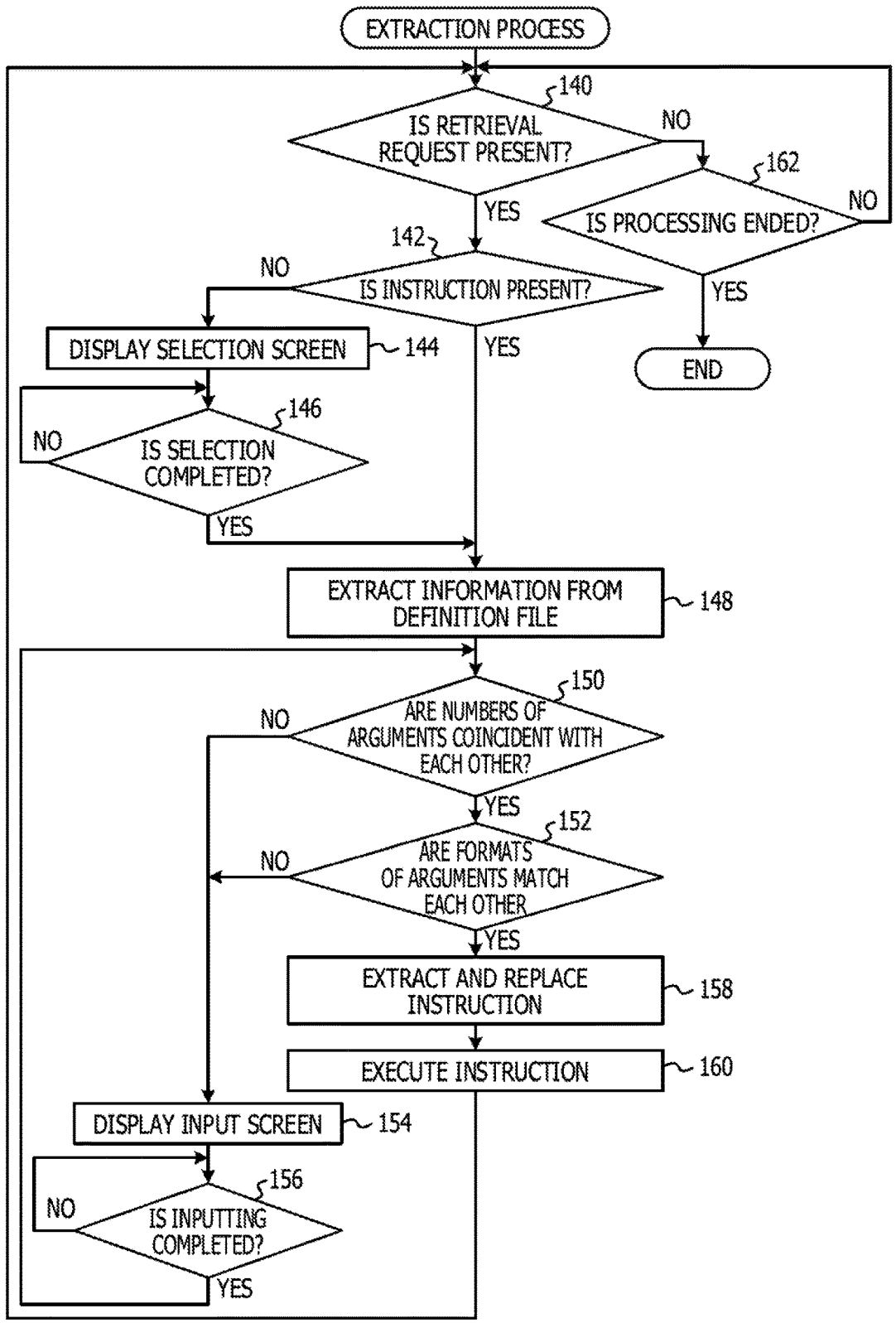
FIG. 15 is a flowchart illustrating an example of an extraction process according to the embodiment.

In the control device 10, when an instruction to start the program B16 is input by a user, and the start of the execution base 12 is initiated, the control device 10 executes the control program 90 to execute the extraction process illustrated in FIG. 15.

When the program B16 is started, the user manipulates the control device 10. At Operation 140 of the extraction process illustrated in FIG. 15, the extraction unit 46 determines whether a request for retrieval of the instruction opened to outside has been made from the program B16. When the control device 10 is manipulated by the user, and the function to execute the instruction 16A of the program B16 is used, the result of determination at Operation 140 becomes Yes, and the process proceeds to Operation 142.

At Operation 142, the extraction unit 46 determines whether the information 32A corresponding to a first argument of the instruction 16A exists in the definition file 32. When a result of the determination is No, the process proceeds to Operation 144, and when the result of the determination is Yes, the process proceeds to Operation 148. At Operation 144, the extraction unit 46, as described above, displays the selection screen 58 on the display device.

When the selection screen 58 is displayed on the display device, the user designates the button 58B corresponding to the processing to be executed. At Operation 146, the extraction unit 46 waits until the button 58B is designated by the user. When the button 58B is designated by the user, the instruction 16A to retrieve the processing corresponding to the designated button 58B is input, the result of the determination at Operation 146 becomes Yes, and the process proceeds to Operation 148. In the following, descriptions will be made by regarding that the first argument corresponds to information indicating the processing contents corresponding to the button 58B designated by the user and the number of second and succeeding arguments is zero (0), in the input instruction 16A.

At Operation 148, the extraction unit 46 extracts the instruction 32B and information 32C associated with the information 32A which corresponds to the first argument of the instruction 16A from the definition file 32. At subsequent Operation 150, the extraction unit 46 determines whether the number of second and succeeding arguments of the instruction 16A coincides with the number of arguments of the information 32C extracted at Operation 148. When a result of the determination is No, the process proceeds to Operation 154, and when the result of the determination is Yes, the process proceeds to Operation 152.

At Operation 152, the extraction unit 46 determines whether the type of second and succeeding arguments of the instruction 16A matches the type of the argument of the information 32C extracted at Operation 148. When a result of the determination is No, the process proceeds to Operation 154, and when the result of the determination is Yes, the process proceeds to Operation 158.

At Operation 154, the extraction unit 46 displays the input screen 56 on the display device as described above. When the input screen 56 is displayed on the display device, the user inputs information in the input field 56B and designates the button 56C. At Operation 156, the extraction unit 46 waits until the button 56C is designated by the user. When the button 56C is designated by the user, the instruction 16A regarding the information input in the input field 56B as the second and succeeding arguments is input, the result of the determination at Operation 156 becomes Yes, and the process returns to Operation 150.

At Operation 158, the extraction unit 46 extracts the instruction corresponding to the instruction 32B extracted at Operation 148 from the call processing execution file 30 stored in the API storing unit 52. The extraction unit 46 replaces the instruction 16A of the program B16 with the instruction 16B using the extracted instruction. At subsequent Operation 160, the execution unit 48 executes the instruction 16B replaced at Operation Step 158, and then, the process returns to Operation 140.

Meanwhile, when a result of the determination at Operation 140 is No, the process proceeds to Operation 162. At Operation 162, the determination unit 42 determines whether a specific end timing has arrived. In the present embodiment, for example, when an instruction to end the execution of the program B16 is input, the determination unit 42 determines that the specific end timing has arrived. When a result of the determination at Operation 160 is No, the process returns to Operation 140, and when the result of the determination at Operation 160 is Yes, the control process is ended.

As described above, according to the present embodiment, the storage control unit 44 stores the call processing execution file 30 in the API storing unit 52 capable of being referenced by the execution base 12. Accordingly, it may be possible to readily cooperate with another program.

According to the present embodiment, the storage control unit 44 stores the call processing execution file 30 in the directory 52B under the directory 52A in which the execution base 12 is installed. Accordingly, the execution base 12 may execute the instruction included in the call processing execution file 30 without setting the environment variable of the operating system or the execution base 12.

According to the present embodiment, when the same file as the call processing execution file 30 specified by the specifying unit 40 is stored in the API storing unit 52, the storage control unit 44 does not store the call processing execution file 30 in the API storing unit 52. Accordingly, it may be possible to reduce a processing load by the control device 10.

According to the present embodiment, the file name of the call processing execution file 30 includes the information specifying that the file is the call processing execution file including an instruction called by an external program. Accordingly, it may be possible to readily specify that the file is the call processing execution file.

In the above-described embodiment, the case where an application program for using a bank account is applied as the program A14 and an application program for preparing a housekeeping book is applied as the program B16 is described, but the present disclosure is not limited thereto. As long as the function of the program A14 may be used from the program B16, other application programs may be applied as the program A14 and the program B16.

In the above-described embodiment, descriptions have been made on the case where the program A14 corresponds to the program B16 in a one-to-one relationship, but the present disclosure is not limited thereto. For example, a configuration in which respective functions of a plurality of different programs A14 are used by a single program B16 may be adopted. For example, a configuration in which a function of a single program A14 is used by a plurality of different programs B16 may be adopted and otherwise, a configuration in which respective functions of a plurality of different programs A14 are used by a plurality of different programs B16 may be adopted.

In the above-described embodiment, descriptions have been made on the case where the storage control unit 44 stores the call processing execution file 30 in the directory 52B under the directory 52A in which the execution base 12 is installed, but the present disclosure is not limited thereto. A configuration in which the storage control unit 44 stores the call processing execution file 30 in another storage area capable of being referenced by the execution base 12 may also be adopted. In this exemplary configuration case, the storage destination of the call processing execution file 30 may be set in a setting file for the environment variable of operating system or the execution base 12.

In the above-described embodiment, descriptions have been made on the case where the information 32A, the instruction 32B, and information 32C are associated with each other using the definition file 32, but the present disclosure is not limited thereto. For example, a configuration in which a retrieval service where the information 32A, the instruction 32B, and information 32C are associated with each other is used may also be adopted. In this exemplary configuration case, the extraction unit 46 may extract the instruction 32B and information 32C associated with the information 32A, which corresponds to the first argument of the instruction 16A, using the retrieval service. In this exemplary configuration case, the definition file 32 may not be included in the execution file group 26. For example, a configuration in which the same information as the definition file 32 is included in the call processing execution file 30 and the definition file 32 is not generated may also be adopted.

In the above-described embodiment, descriptions have been made on the case where the generation program 70 is stored (installed) in the storing unit 63 in advance, but the present disclosure is not limited thereto. The generation program may be provided in a form of a recording medium such as a CD-ROM, a DVD-ROM, or a USB memory by being recorded therein.

In the above-described embodiment, descriptions have been made on the aspect in which the control program 90 and the execution base 12 are stored (installed) in the storing unit 83 in advance, but the present disclosure is not limited thereto. The control program according to the present disclosure or the execution base to which modification is made based on the function implemented by the control program according to the present disclosure may be provided in a form of a recording medium such as a CD-ROM, a DVD-ROM, or a USB memory by being recorded therein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a control program for causing a computer to execute a control process, the control process comprising:
  compiling a source file of a program such that an execution file of the program is generated, the source file including a plurality of instructions written in a predetermined format and a comment in which processing contents and arguments of each of the plurality of instructions that are associated with each other are written;
  extracting, from the execution file of the program, only an instruction including specifying information that indicates the instruction is to be called by an external program of the execution file of the program such that a call processing execution file is generated;
  associating the processing contents and the arguments of each of the plurality of instructions of the source file, and information used to call the plurality of instructions of the source file with each other based on the comment of the source file such that a definition file is generated;
  incorporating the execution file of the program, the call processing execution file and the definition file such that an execution file group is generated;
  selecting the call processing execution file and the definition file from the execution file group;
  determining whether the same file as the specified call processing execution file is stored in a storage area which is capable of being referenced by an execution based program which executes the program;
  when it is determined that the same file as the call processing execution file is not stored in the storage area, storing the call processing execution file in the storage area;
  and
  extracting an instruction of the call processing execution file corresponding to a retrieval request by the external program with reference to the storage area in response to the retrieval request.

2. The non-transitory computer-readable recording medium according to claim 1, wherein the storage area is an area under a directory in which the execution based program is installed.

3. The non-transitory computer-readable recording medium according to claim 1, wherein the call processing execution file includes the specifying information in a file name.

4. The non-transitory computer-readable recording medium according to claim 1, wherein whether the same file as the call processing execution file is stored in the storage area is determined using at least one of a size of a file, a timestamp for a file, and a checksum for a file.

5. A control device comprising:
  a memory; and
  a processor coupled to the memory and the processor configured to:
  compile a source file of a program such that an execution file of the program is generated, the source file including a plurality of instructions written in a predetermined format and a comment in which processing contents and arguments of each of the plurality of instructions that are associated with each other are written;
  extract, from the execution file of the program, only an instruction including specifying information that indicates the instruction is to be called by an external program of the execution file of the program such that a call processing execution file is generated;

associate the processing contents and the arguments of each of the plurality of instructions of the source file, and information used to call the plurality of instructions of the source file with each other based on the comment of the source file such that a definition file is generated;

incorporate the execution file of the program, the call processing execution file and the definition file such that an execution file group is generated;

select the call processing execution file and the definition file from the execution file group;

determine whether the same file as the specified call processing execution file is stored in a storage area which is capable of being referenced by an execution based program which executes the program;

when it is determined that the same file as the call processing execution file is not stored in the storage area, store the call processing execution file in the storage area;

and extract an instruction of the stored call processing execution file corresponding to a retrieval request by the external program with reference to the storage area in response to the retrieval request.

6. The control device according to claim 5, wherein the storage area is an area under a directory in which the execution base program is installed.

7. The control device according to claim 5, wherein the call processing execution file includes the specifying information in a file name.

8. The control device according to claim 5, wherein the processor determines whether the same file as the call processing execution file is stored in the storage area using at least one of a size of a file, a timestamp for a file, and a checksum for a file.

9. A control method comprising:

compiling a source file of a program such that an execution file of the program is generated, the source file including a plurality of instructions written in a predetermined format and a comment in which processing contents and arguments of each of the plurality of instructions that are associated with each other are written;

extracting, from the execution file of the program, only an instruction including specifying information that indicates the instruction is to be called by an external program of the execution file of the program such that a call processing execution file is generated;

associating the processing contents and the arguments of each of the plurality of instructions of the source file, and information used to call the plurality of instructions of the source file with each other based on the comment of the source file such that a definition file is generated;

incorporating the execution file of the program, the call processing execution file and the definition file such that an execution file group is generated;

selecting the call processing execution file and the definition file from the execution file group;

determining whether the same file as the specified call processing execution file is stored in a storage area which is capable of being referenced by an execution based program executing the program;

when it is determined that the same file as the call processing execution file is not stored in the storage area, storing the call processing execution file in the storage area;

and extracting an instruction of the call processing execution file corresponding to a retrieval request by the external program with reference to the storage area in response to the retrieval request.

10. The control method according to claim 9, wherein the storage area is an area under a directory in which the execution based program is installed.

11. The control method according to claim 9, wherein the call processing execution file includes the specifying information in a file name.

12. The control method according to claim 9, wherein determining whether the same file as the call processing execution file is stored in the storage area is performed using at least one of a size of a file, a timestamp for a file, and a checksum for a file.

* * * * *